(12) United States Patent
Preisler

(10) Patent No.: US 10,583,593 B2
(45) Date of Patent: Mar. 10, 2020

(54) ANTIMICROBIAL, MOLDED LAMINATE SHOPPING CART PART AND METHOD OF MANUFACTURING SAME

(71) Applicant: Global IP Holdings, LLC, Sterling Heights, MI (US)

(72) Inventor: Darius J. Preisler, Macomb, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 936 days.

(21) Appl. No.: 14/227,113

(22) Filed: Mar. 27, 2014

(65) Prior Publication Data

US 2014/0203475 A1  Jul. 24, 2014

Related U.S. Application Data

(62) Division of application No. 13/095,220, filed on Apr. 27, 2011, now Pat. No. 8,864,148.

(51) Int. Cl.
| | |
|---|---|
| *B29C 45/14* | (2006.01) |
| *B62B 3/14* | (2006.01) |
| *C08J 7/04* | (2020.01) |
| *B29L 31/00* | (2006.01) |
| *B62B 5/06* | (2006.01) |

(52) U.S. Cl.
CPC ........ *B29C 45/14* (2013.01); *B29C 45/14811* (2013.01); *B62B 3/144* (2013.01); *C08J 7/04* (2013.01); *B29L 2031/771* (2013.01); *B62B 5/069* (2013.01); *B62B 2501/04* (2013.01); *B62B 2501/065* (2013.01); *Y10T 428/2495* (2015.01); *Y10T 428/265* (2015.01); *Y10T 428/31797* (2015.04); *Y10T 428/31855* (2015.04)

(58) Field of Classification Search
CPC ............ B29C 37/0025; B29C 37/0032; B29C 2037/0035; B29C 45/14; B29C 45/14688; B29C 45/148; B29C 2045/14237; B62B 3/144; Y10T 428/31786; Y10T 428/31797
See application file for complete search history.

(56) References Cited

U.S. PATENT DOCUMENTS

| | | | |
|---|---|---|---|
| 3,798,052 A | 3/1974 | Ebeling | |
| 4,204,018 A * | 5/1980 | Bernstein | ............... A01N 25/34 442/38 |

(Continued)

OTHER PUBLICATIONS

Office Action; U.S. Appl. No. 13/095,220, dated Apr. 9, 2014.

(Continued)

*Primary Examiner* — Matthew J Daniels
*Assistant Examiner* — Andrew D Graham
(74) *Attorney, Agent, or Firm* — Brooks Kushman P.C.

(57) ABSTRACT

An antimicrobial, molded laminate shopping cart part and method of manufacturing same are provided. The part, such as a small child seat, includes a structural carrier made from a thermoplastic resin and having an outer surface. The part further includes a formed plastic film sheet having upper and lower surfaces. The lower surface is bonded to the outer surface of the carrier. The film sheet includes an outer clear plastic layer including at least one antimicrobial agent disbursed throughout the plastic layer. The antimicrobial agent exhibits controlled migration through the clear plastic to the outer surface of the clear plastic layer.

8 Claims, 5 Drawing Sheets

(56) References Cited

U.S. PATENT DOCUMENTS

| | | | |
|---|---|---|---|
| 4,537,413 A | 8/1985 | Rehrig | |
| 5,554,373 A * | 9/1996 | Seabrook | A01N 49/000 424/400 |
| RE35,970 E | 11/1998 | Ellison et al. | |
| 6,036,264 A * | 3/2000 | Lucree | B62B 3/144 297/218.4 |
| 6,096,396 A * | 8/2000 | Patton | B44C 1/17 156/230 |
| 6,309,741 B1 | 10/2001 | Boyle | |
| 6,448,305 B1 * | 9/2002 | Watterson, III | A01N 25/10 523/122 |
| 6,540,240 B2 | 4/2003 | Nadeau et al. | |
| 6,761,364 B2 | 7/2004 | Murar et al. | |
| 6,869,085 B2 | 3/2005 | Pettigrew et al. | |
| 6,982,289 B2 | 1/2006 | Kuratsuji et al. | |
| 7,101,505 B2 | 9/2006 | Winget et al. | |
| 7,443,295 B2 | 10/2008 | Brice et al. | |
| 7,910,171 B2 * | 3/2011 | Trajkovich | A01N 25/34 427/384 |
| 2001/0045676 A1 * | 11/2001 | Winterton | B29C 37/0032 264/2.5 |
| 2002/0020976 A1 | 2/2002 | Nadeau et al. | |
| 2002/0092132 A1 | 7/2002 | Kessler | |
| 2004/0066070 A1 * | 4/2004 | Sampson | B62B 3/144 297/256.17 |
| 2005/0214350 A1 | 9/2005 | Thompson | |
| 2006/0110617 A1 * | 5/2006 | Kitaike | B29C 45/14811 428/522 |
| 2007/0019049 A1 * | 1/2007 | Heiman | B29C 37/0032 347/101 |
| 2007/0152410 A1 | 7/2007 | Clark et al. | |
| 2007/0190310 A1 * | 8/2007 | Yusa | B29C 37/0032 428/323 |
| 2007/0224433 A1 * | 9/2007 | Saitou | B29C 45/1418 264/101 |
| 2007/0261274 A1 * | 11/2007 | Fox | B29C 37/0032 36/154 |
| 2008/0318074 A1 * | 12/2008 | Suga | B29C 45/14811 428/483 |
| 2009/0176045 A1 * | 7/2009 | Kanae | B29C 44/04 264/255 |
| 2010/0171234 A1 * | 7/2010 | Lee | B29C 45/0001 264/129 |
| 2011/0012404 A1 * | 1/2011 | Cariera | B62B 3/144 297/219.12 |
| 2011/0018249 A1 | 1/2011 | Sonnendorfer et al. | |
| 2011/0065804 A1 * | 3/2011 | Diaddario | C25D 3/02 514/690 |
| 2011/0217544 A1 * | 9/2011 | Young | B29C 37/0032 428/327 |
| 2015/0024019 A1 * | 1/2015 | Ali | B05D 3/02 424/411 |

OTHER PUBLICATIONS

International Search Report and Written Opinion; International application No. PCT/US2012/025799; dated May 30, 2012.
International Preliminary Report on Patentability; International application No. PCT/US2012/025799; dated Oct. 29, 2013.

* cited by examiner

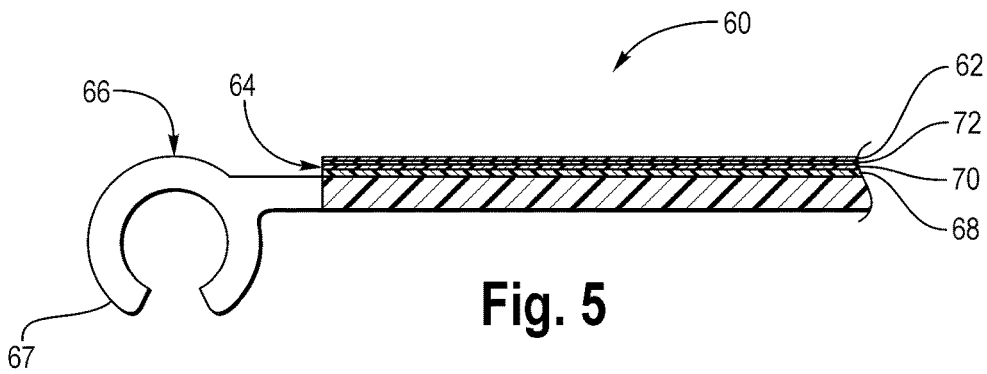
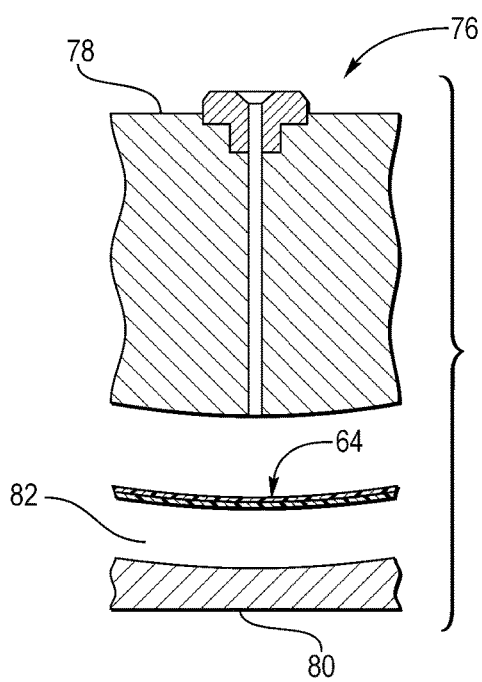
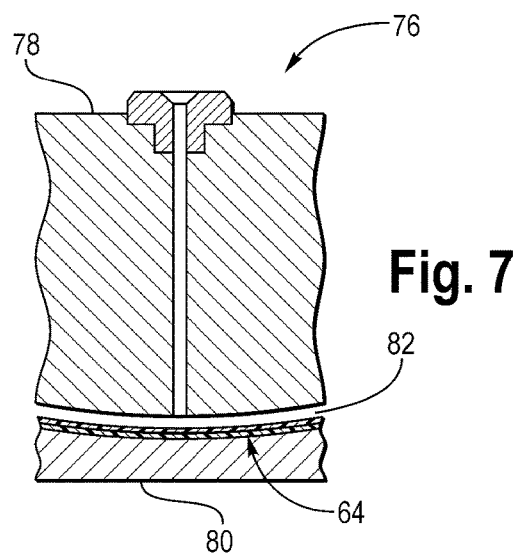
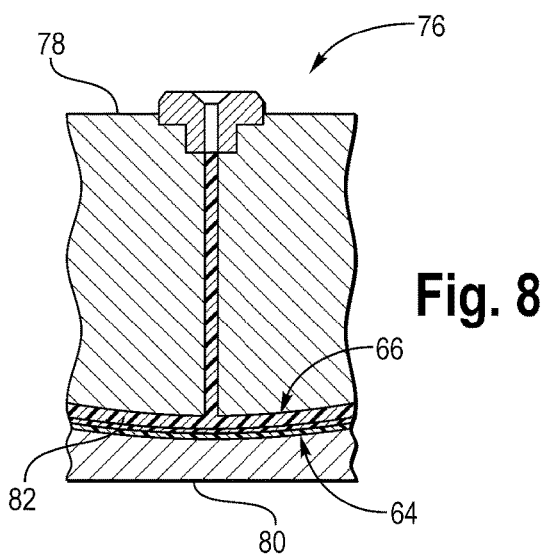

ANTIMICROBIAL, MOLDED LAMINATE SHOPPING CART PART AND METHOD OF MANUFACTURING SAME

CROSS REFERENCE TO RELATED APPLICATION

This application is a division of U.S. patent application Ser. No. 13/095,220 filed Apr. 27, 2011, the disclosure of which is incorporated in its entirety by reference herein.

TECHNICAL FIELD

This invention relates in general to the field of shopping cars and methods of making same and, more particularly, to shopping carts, the parts or components of which are formed of a formed plastic film sheet and a moldable material such as a thermoplastic resin during an injection molding process.

BACKGROUND

Shopping carts are relatively well known in the art, and are configured in a wide variety of forms. Typical shopping carts comprise a metal frame, four rolling casters that support the metal frame, and an attached basket that is formed from either metal or plastic.

As one example, U.S. Pat. No. 4,537,413 to Rehrig discloses a plastic basket for use with a cart having front and rear baskets. The patent states that the baskets are manufactured from a plastic material. The rear basket is positioned behind the front basket and may be secured to horizontal frame of the cart chassis by bolts or other fastening means such as rivets. A child seat may be molded as a solid part for carrying a logo or advertisement.

U.S. Pat. No. 6,309,741 discloses a shopping cart having a foam pad on which young children can sit. The pad can display indicia such as a character or advertisement.

FIG. 1 (which corresponds to FIG. 1 of U.S. Pat. No. 6,761,364) is a perspective view of a prior art plastic shopping cart 10. FIG. 2 (which corresponds to FIG. 2 of the '364 patent) is an exploded view of the cart 10. A decoration badge may be formed in a close-out panel or in a front portion of a bottom carrier of the cart via an insert molding technique.

The plastic shopping cart 10 comprises a number of distinct components, each of which is formed from a moldable material such as, for example, a thermoplastic resin via an injection molding process. Forming the shopping cart 10 in this manner provides a sturdy, stable structure for transporting heavy goods or products, as well as small children. The plastic shopping cart 10 is comprised of easily replaceable components, which reduces the cost of maintenance. In addition, because the components are plastic, the plastic shopping cart will not rust, and may be recycled after the useful life of the cart has expired.

The plastic shopping cart 10 includes a base assembly 12 that includes two swivel caster wheels 14 and 16, two fixed caster wheels 18 and 19, and a chassis 20. The caster wheels are affixed to the chassis 20 by means of suitable fasteners, to enable the plastic shopping cart 10 to be easily maneuvered, and are designed to support loads of up to several hundred pounds. In one embodiment, four screws are utilized to secure each caster wheel to the chassis 20. The base assembly 12 also includes a bottom carrier 22, two close-out panels 24 and 26, and a cross-member 28, all of which are secured to the chassis 20. The bottom carrier 22 provides the shopping cart 10 with additional space for the undercarriage storage of goods.

A plastic basket 30 is mounted on the base assembly 12 as shown. In the illustrated embodiment, eight fasteners such as, for example, screws are utilized to secure the plastic basket 30 onto an upper surface 32 of the chassis 20. A handle 34 is attached to an upper, rear portion of the plastic basket 30 to allow a user to move the plastic shopping cart over the ground.

The plastic shopping cart 10 also includes a gate and seat assembly 36 that is pivotably attached to the plastic basket at apertures 38 and 40. In the illustrated embodiment, the gate and seat assembly 36 includes a swing gate 42, two aluminum rods 44 and 46, a back rest 48, seat bracket 50, a seat 52, and a flip top 54. The back rest 48 is pivotable with respect to the swing gate 42 about the axis of aluminum rod 46. The seat 52 and the flip top 54 are pivotable about the axis of aluminum rod 44.

U.S. Pat. No. 6,869,085 discloses a disposable shopping cart handle sanitary cover. A topmost layer of the sanitary cover is removable for exposing another layer therebeneath for providing a sanitary surface to be gripped by a user.

U.S. Pat. No. 6,982,289 discloses a shopping cart painted with an antibacterial powder paint composition.

U.S. Pat. No. 7,443,295 discloses a media enhanced shopping cart system. In an embodiment, substantially the entire cart is made of plastic. A basket 20, a frame 30 and a base tray 50 are all made of plastic, and minor components, such as screws or other connectors, the wheels 37 and 38, and the like may be made of plastic or a metal. In an embodiment, the plastic used in the cart 10 comprises a high-density polyethylene ("HDPE"). The plastic is flame retardant and, in an embodiment, includes MICROBAN™, a product to inhibit the growth of bacteria, which aids in keeping the cart 10 cleaner.

Published U.S. patent application 2002/0092132 discloses a semi-rigid protective sleeve for a substantially cylindrical handle of a shopping cart. The sleeve is made up of a thin sheet of material, preferably anti-bacterial polypropylene, of sufficient size to surround the handle. The sleeve has a first and second longitudinal edge to releasably conform to the handle. The edges are preferably notched to accommodate any protrusions of the handle. The sleeve is suitable for use as an advertising vehicle.

Published U.S. patent application 2005/0214350 discloses a shopping cart handle which is covered by a monofilament sheet and/or multi-layered sheet with the antimicrobial Triclosan, and/or antimicrobial Microban incorporated therein.

Published U.S. patent application 2007/0152410 discloses a seat liner for use in a shopping cart. The liner may display advertisements thereon.

Published U.S. patent application 2011/0018249 discloses a molded plastic shopping cart including ion-releasing surfaces having antimicrobial efficacy. The ion-releasing material is integrated into the molded plastic during production.

Published U.S. patent application 2011/0065804 discloses electrodeposited metallic finishes for articles including shopping carts. The finishes include antimicrobial agents.

Other related U.S. patents include U.S. Pat. Nos. 6,395,219; 6,448,305 and 7,101,505.

FIG. 3 is a top plan view of a prior art small child plastic seat of a plastic shopping cart. The seat has a warning printed thereon with a single color ink. One problem associated with such a seat is that the ink warning can be easily scrapped off or damaged. Also, such seats typically have high scrap rates, and are expensive to make, at least in part, due to high labor costs.

SUMMARY OF EXAMPLE EMBODIMENTS

An object of at least one example embodiment of the present invention is to provide an antimicrobial, molded laminate shopping cart part and method of manufacturing same to protect shoppers and their small children by reducing the number of undesirable microorganisms on surfaces of shopping cart handles, child seats and, generally, plastic parts surrounding the seats.

In carrying out the above object and other objects of the present invention, an antimicrobial, molded laminate shopping cart part is provided. The part includes a structural carrier made from a thermoplastic resin and has an outer surface. The part further includes a formed plastic film sheet having upper and lower surfaces. The lower surface is bonded to the outer surface of the carrier. The film sheet includes an outer clear plastic layer comprising at least one antimicrobial agent disbursed throughout the plastic layer where the antimicrobial agent exhibits controlled migration through the clear plastic to the outer surface of the clear plastic layer.

The film sheet may be a prepainted film sheet which provides a warning or advertisement.

The clear plastic layer may include an acrylic polymer clear coat layer.

The film sheet may include a layer of acrylic color and polyvinylidene fluoride.

The polyvinylidene fluoride may include more than 50 percent of the total thickness of the film sheet.

The part may include a shopping cart child seat.

The total thickness of the film sheet may be less than 1.0 mils.

The film sheet may be a polyester film sheet.

The structural carrier may include an attachment portion for removably attaching the part to the shopping cart.

Further in carrying out the above object and other objects of the present invention, an antimicrobial, molded laminate shopping cart child seat is provided. The child seat includes a structural carrier made from a thermoplastic resin. The structural carrier has an outer surface. The carrier includes an attachment portion for removably attaching the seat to the shopping cart. The child seat includes a formed plastic prepainted film sheet having upper and lower surfaces and provides a warning or advertisement. The lower surface is bonded to the outer surface of the carrier. The film sheet includes an outer clear plastic layer including at least one antimicrobial agent disbursed throughout the plastic layer where the antimicrobial agent exhibits controlled migration through the clear plastic to the outer surface of the clear plastic layer.

Still further in carrying out the above object and other objects of the present invention, a method of manufacturing an antimicrobial molded laminate shopping cart part is provided. The method includes providing a formed plastic film sheet having top and bottom surfaces. The top surface is covered by a clear plastic layer which covers the top surface. The plastic layer includes at least one antimicrobial agent disbursed throughout the plastic layer where the antimicrobial agent exhibits controlled migration throughout the clear plastic to the outer surface of the clear plastic layer. The method further includes placing the film sheet in a mold cavity of an injection mold having a shape defining the desired shopping cart part. The method still further includes injecting a thermoplastic resin into the mold cavity of the injection mold to generate a structural carrier for the film sheet. The generation of the structural carrier creates sufficient pressure and heat to bond the structural carrier to the bottom surface of the film sheet to form the molded laminate part.

The film sheet may be a pre-painted film sheet which provides a warning or advertisement.

The clear plastic layer may include an acrylic polymer clear coat layer.

The film sheet may include a layer of acrylic color and polyvinylidene fluoride.

The polyvinylidene fluoride may include more than 50 percent of the total thickness of the film sheet.

The part may include a shopping cart child seat.

The total thickness of the film sheet may be less than 1.0 mils.

The film sheet may be a polyester film sheet.

The structural carrier may include an attachment portion for removably attaching the part to the shopping cart.

Further in carrying out the above object and other objects of the present invention, a method of manufacturing an antimicrobial molded laminate shopping cart child seat is provided. The method includes providing a formed plastic pre-painted film sheet having top and bottom surfaces and providing a warning or advertisement. The top surface is covered by a clear plastic layer which covers the top surface. The plastic layer includes at least one antimicrobial agent disbursed throughout the plastic layer where the antimicrobial agent exhibits controlled migration throughout the clear plastic to the outer surface of the clear plastic layer. The method still further includes placing the film sheet in a mold cavity of an injection mold having a shape defining the shopping cart seat. The method further includes injecting a thermoplastic resin into the mold cavity of the injection mold to generate a structural carrier for the film sheet. The carrier includes an attachment portion for removably attaching the seat to the shopping cart. The generation of the structural carrier creates sufficient pressure and heat to bond the structural carrier to the bottom surface of the film sheet to form the molded laminate seat.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 5 is a view, partially broken away and in cross section, taken along lines 5-5 of FIG. 4;

FIG. 6 is a schematic view, partially broken away and in cross section, of a conventional injection molding system which may be utilized to make plastic parts or components of the present invention; a mold of the system is depicted in an open position with a formed plastic film sheet placed between two mold halves of the mold;

FIG. 7 is a view similar to the view of FIG. 6 with the mold depicted in a closed position, with the film sheet placed in a mold cavity between the two mold halves;

FIG. 8 is a view similar to the view of FIGS. 6 and 7 depicting the mold cavity with the molten resin injected therein to form the structural carrier for the film sheet and the resulting part.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 4:
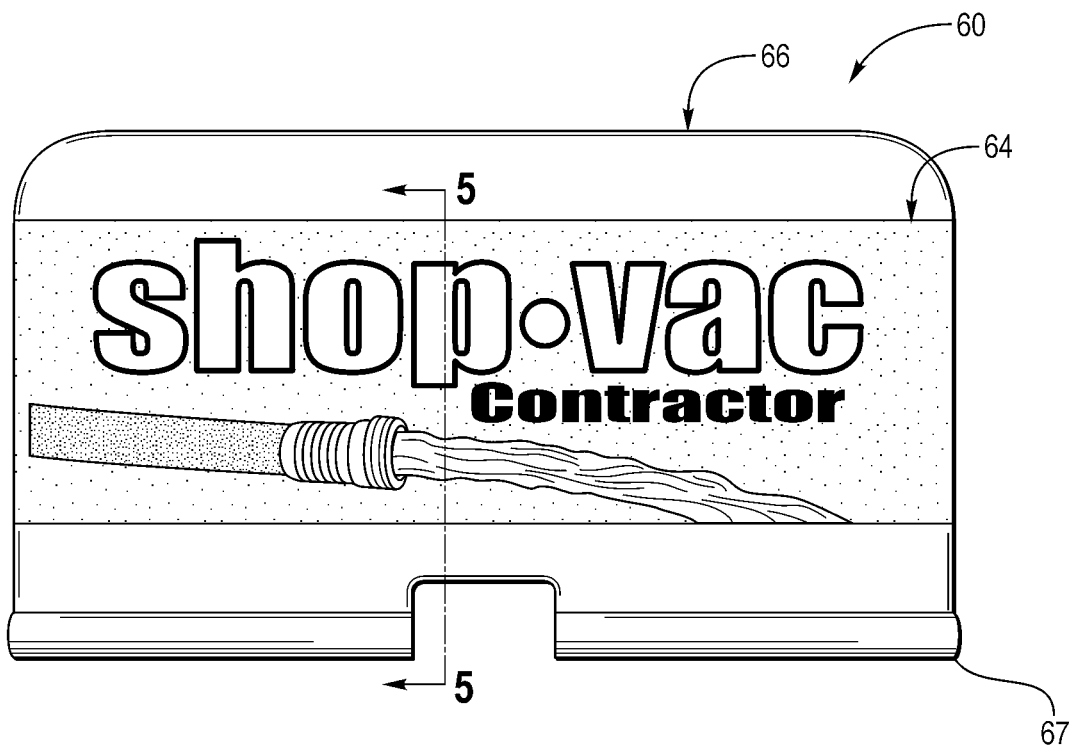
FIG. 4 is a top plan view of a plastic child seat for use in a shopping cart such as the shopping cart of FIGS. 1 and 2 and manufactured in accordance with at least one embodiment of the present invention.

Referring now to FIGS. 4 and 5, there is illustrated an antimicrobial, molded laminate shopping cart part, such as a small child seat, generally indicated at 60, constructed in accordance with at least one embodiment of the present invention. The part 60 is antimicrobial in the sense that a clear coat plastic covering layer 62 of a formed film sheet, generally indicated at 64, has at least one antimicrobial agent dispersed throughout the layer 62.

"Antimicrobial" is equivalent to antibacterial, antifungal, antiviral, antiparasitic, microbicidal, and microbistatic. Most antimicrobial agents control microorganism growth by penetrating the microorganism's thin cellular walls, thereby interrupting the organism metabolic function, and finally killing said organism.

A part having "antimicrobial properties" includes any material that kills or inhibits growth of a microorganism.

A "microorganism" corresponds to bacteria, fungi, archea and protists and most typically the microorganism is unicellular.

"Dispersed throughout" corresponds to the dispersal of a species, e.g., an antimicrobial agent, homogeneously or heterogeneously throughout the clear plastic layer. For example, the antimicrobial agent may be homogeneously dispersed throughout the finish such that the concentration of antimicrobial agent at the surface is substantially the same as the concentration at any other sampling location in the layer. Heterogeneous dispersal corresponds to more antimicrobial agent at one sampling location in the layer relative to some other sampling location in the layer. For example, there may be more antimicrobial agent at the surface relative to other sampling locations or there may be islands of more concentrated antimicrobial agent throughout the layer.

The film sheet 64 is a thin membrane composite having a thickness of less than 0.5 millimeters.

The film sheet 64 is preferably pre-painted. The film sheet 64 is preferably a polyester sheet such as Mylar®, a polyurethane or polycarbonate sheet.

The part 60 also includes a structural carrier 66 which may be formed from a thermoplastic resin such as polyolefin, polycarbonate, tee tpe, sebs tpe, and a mixture of polycarbonate and acrylonitrile/butadiene/styrene (ABS). The corresponding film layer or sheet 64 is compatible with the plastic of the structural carrier so that diffusion between contact surfaces occurs in the method of the present invention as described hereinbelow. The carrier 66 includes an attachment portion 67 for removably attaching the part 60 to the shopping cart.

The film sheet 64 preferably has the following coatings placed on a membrane 68, layer 70 of acrylic color in mating contact with the membrane 68 and a layer 72 of polyvinylidine fluoride (PVDF) with the acrylic clear coat 62 to protect the film from damage and to provide film elasticity, chemical resistance, stain resistance, weathering and UV protection. In the most preferred embodiment, PVDF comprises about 72% of the total pre-form thickness which is less than 1.0 mils and is preferably about 0.2 mils.

Referring now to FIGS. 6 through 8, there is illustrated a conventional injection mold, generally indicated at 76, of a system for making a plastic component pursuant to the present invention. With such a system there is included an injection molding machine, having a nozzle for injecting predetermined amounts or shots of molten resin. The injection molding machine includes a hydraulic screw ram which is disposed in a bore formed in a barrel of the injection molding machine. The ram plasticizes and advances resin towards the nozzle. Upon complete plasticization of the resin, the screw ram is hydraulically advanced towards threaded portions of the barrel to inject molten plastic through the nozzle, as is well known in the art.

As depicted in FIG. 6, opposing surfaces of mold parts 78 and 80, respectively, of the mold 76 define a mold cavity 82 with the formed film sheet 64 disposed therein. FIG. 6 illustrates an open position of the mold 76 and FIG. 7 illustrates a closed position of the mold 76.

As illustrated in FIG. 6, there is a depiction of a one-piece film sheet 64 which is first placed in the mold cavity 82 in the open position of FIG. 6. Thereafter, as depicted in FIGS. 7 and 8, the structural carrier 66 is molded in the mold 76 of the plastic injection molding system to form a completed unitary laminate plastic component.

In an alternative embodiment, the mold 76 can be modified to produce a plastic component or part with embossed lettering. This embossed effect is achieved by etching into the mold 76 the desired pattern or letters so that the letters have at least a 0.5 millimeter radius on the edge of the letter, or else the film sheet 64 may tear and stretch.

The unique features of the laminate plastic components or parts are 1) a stiff inner material to support the intended application; 2) reduction and/or elimination of paint problems such as drips, runs, spits, dry spray, light coverage and gloss and improved color match and paint adhesion; 3) reduced molding scrap due to splay, flow marks and minor surface imperfections, which can be completely covered by the film sheet 64; and 4) increased durability of the resulting plastic laminate components.

Figure 9:
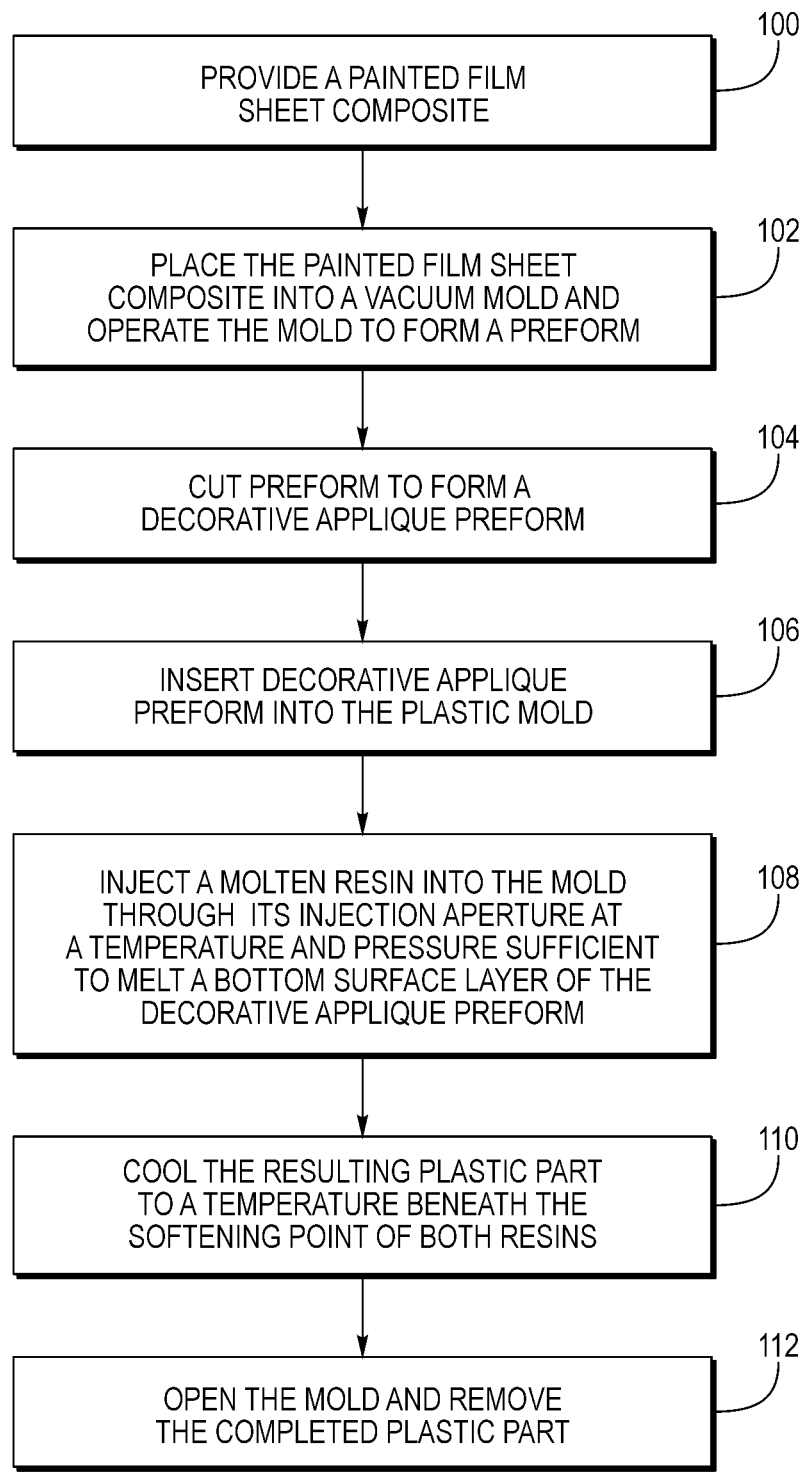
FIG. 9 is a block diagram flow chart illustrating various method steps for manufacturing the plastic part or component.

Referring now to FIG. 9, there is illustrated in a block diagram flow chart form various method steps for forming the part 60 of the present invention.

At block 100, a painted film sheet composite is initially provided.

At block 102, the painted film sheet composite may be placed in a vacuum mold (not shown) which is operated to form a pre-form if the film sheet 64 is to have anything other than a planar shape. If the film sheet 64 is to have a planar shape, then block 102 can be skipped.

Figure 1:
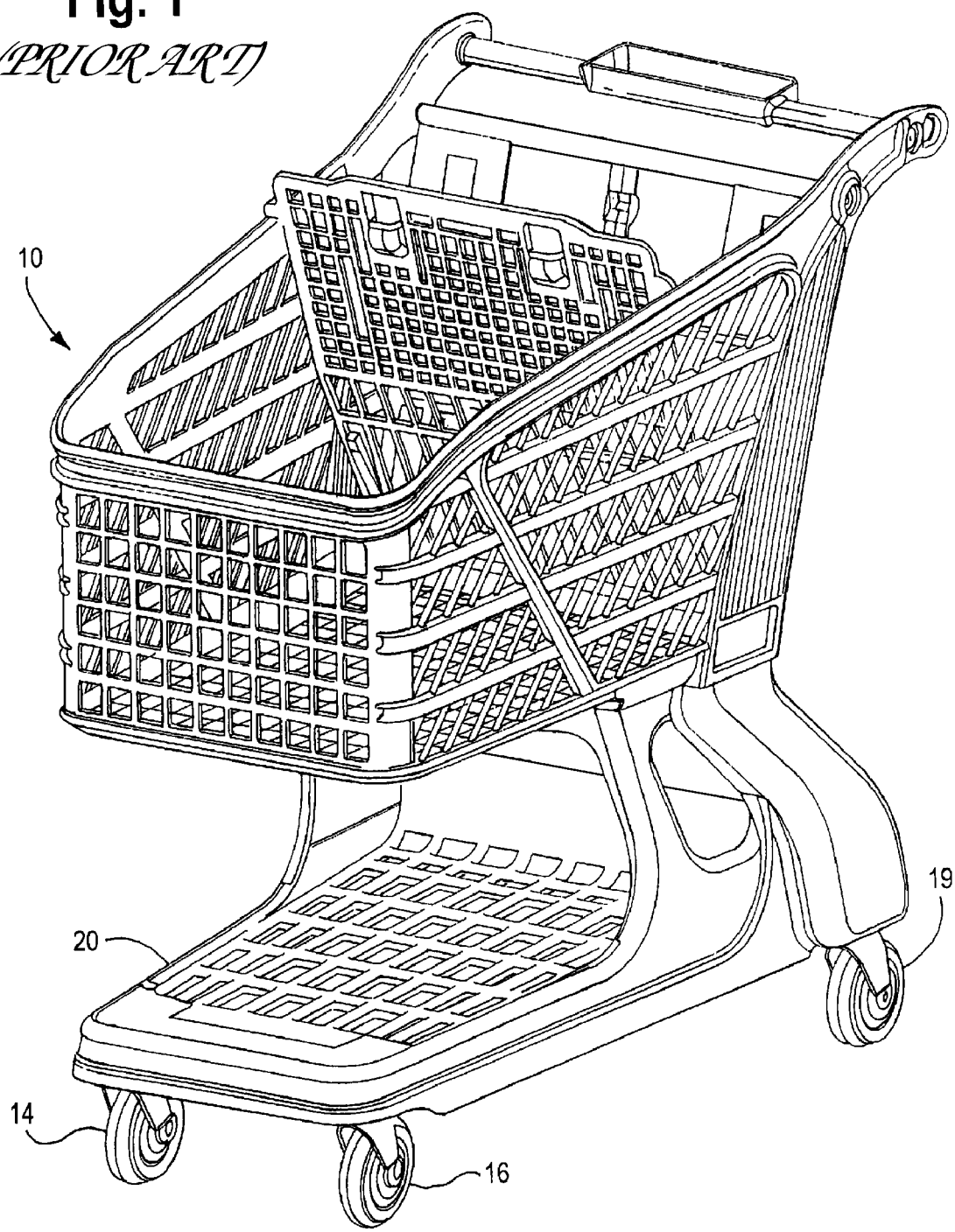
FIG. 1 is a perspective view of one embodiment of a prior art plastic shopping cart.
Figure 2:
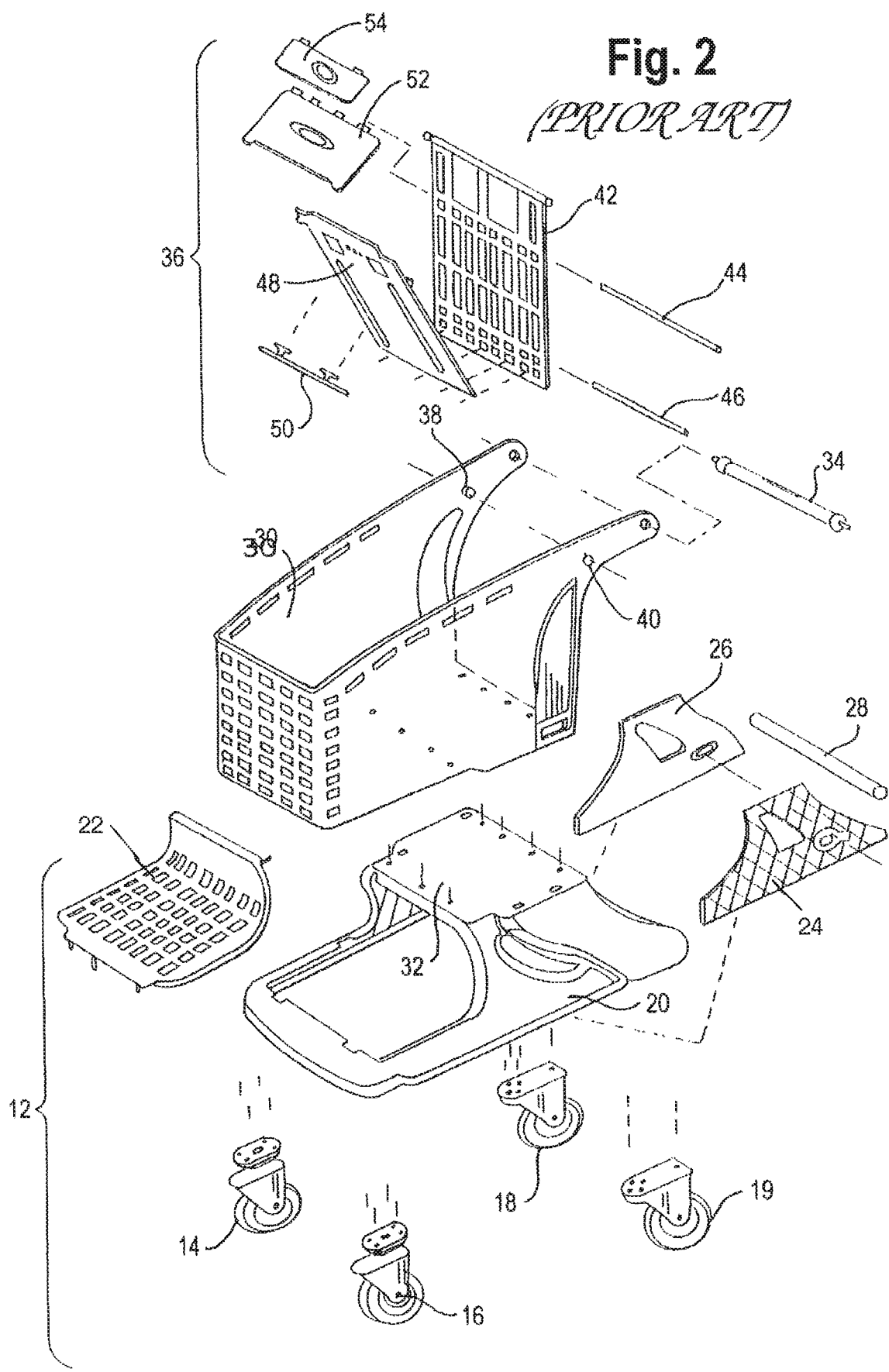
FIG. 2 is an exploded view of the plastic shopping cart shown in FIG. 1.
Figure 3:
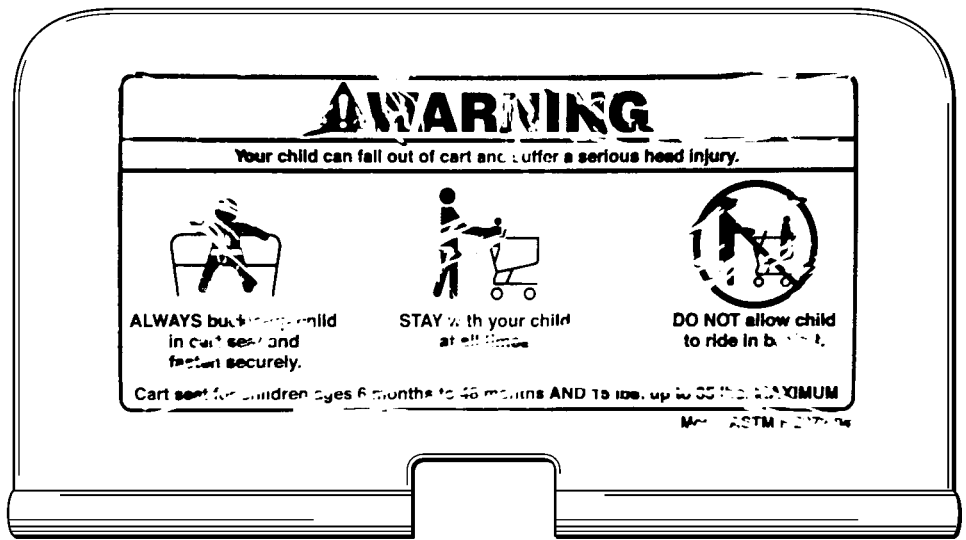
FIG. 3 is a top plan view of a prior art plastic child seat for use in a shopping cart, such as the shopping cart of FIGS. 1 and 2 and having a warning printed thereon.

At block 104, after the film sheet 64 or pre-form has been removed from the vacuum mold (if needed), the pre-form is cut to form the part 60 which may provide a warning as in FIG. 3 or an advertisement as in FIG. 4.

At block 106, the film sheet 64 or pre-form is inserted into the plastic mold 76.

At block 108, molten plastic is injected into the mold 76 through its injection aperture at a temperature and pressure sufficient to melt the bottom surface layer of the film sheet 64 or pre-form.

At block 110, the part 60 is cooled to a temperature beneath the softening point of both resins.

At block 112, the mold 76 is opened and the completed part 60 is removed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manufacturing an antimicrobial molded laminate shopping cart child seat, the method comprising:
   providing a formed plastic pre-painted film sheet having top and bottom surfaces and providing a warning or advertisement, the top surface being covered by a clear plastic layer, the clear plastic layer having an outer surface and comprising at least one antimicrobial agent dispersed throughout the clear plastic layer, wherein the antimicrobial agent exhibits controlled migration throughout the clear plastic layer to the outer surface of the clear plastic layer, the plastic pre-painted film sheet including one or more layers of color in contact with a layer of polyvinylidene fluoride overlaying and protecting the one or more layers of color, wherein the clear plastic layer is in contact with and protects the layer of polyvinylidene fluoride;
   placing the film sheet in a mold cavity of an injection mold having a shape defining the shopping cart child seat; and
   injecting a thermoplastic resin into the mold cavity of the injection mold at a temperature and pressure sufficient to melt the bottom surface of the film sheet to generate a structural carrier for the film sheet, the carrier including an attachment portion for removably attaching the seat to a shopping cart, the generation of the structural carrier creating sufficient pressure and heat to bond the structural carrier to the bottom surface of the film sheet to form the molded laminate seat.

2. A method of manufacturing an antimicrobial molded laminate part, wherein the part comprises a shopping cart child seat, the method comprising:
   providing a painted film sheet including at least one layer of printing, a layer of polyvinylidene fluoride applied over the at least one layer of printing, and an acrylic clear coat layer in contact with and overlaying the layer of polyvinylidene fluoride, the acrylic clear coat layer includes an anti-microbial agent dispersed throughout the acrylic clear coat layer, wherein the antimicrobial agent exhibits controlled migration throughout the acrylic clear coat layer to an outer surface of the acrylic clear coat layer;
   forming the painted film sheet and acrylic clear coat layer in a vacuum forming mold to form a preform;
   cutting the preform to form an applique preform having top and bottom surfaces, the top surface being the clear plastic layer;
   placing the applique preform in a mold cavity of an injection mold having a shape defining the molded laminate part; and
   injecting a thermoplastic resin into the mold cavity of the injection mold at a temperature and pressure sufficient to melt the bottom surface of the film sheet to generate a structural carrier, wherein the thermoplastic resin is injected with sufficient pressure and heat to melt a bottom surface of the applique preform and bond the structural carrier to the applique preform to form the shopping cart child seat.

3. The method of claim 2 wherein the painted film sheet is selected from the group consisting of:
   polyurethane, and
   polycarbonate.

4. The method as claimed in claim 2, wherein the film sheet is a pre-painted film sheet which provides a warning or advertisement.

5. The method as claimed in claim 2, wherein the polyvinylidene fluoride comprises more than 50 percent of the total thickness of the film sheet.

6. The method as claimed in claim 2, wherein the part comprises a shopping cart child seat.

7. The method as claimed in claim 2, wherein the total thickness of the film sheet is less than 1.0 mils.

8. The method as claimed in claim 2, wherein the structural carrier includes an attachment portion for removably attaching the part to a shopping cart.

\* \* \* \* \*